(12) United States Patent
Canard et al.

(10) Patent No.: US 8,593,259 B2
(45) Date of Patent: Nov. 26, 2013

(54) METHOD OF AUTHENTICATING A RADIO TAG BY A RADIO READER

(75) Inventors: Sébastien Canard, Caen (FR); Iwen Coisel, Wavre (BE)

(73) Assignee: France Telecom, Paris (FR)

( * ) Notice: Subject to any disclaimer, the term of this patent is extended or adjusted under 35 U.S.C. 154(b) by 592 days.

(21) Appl. No.: 12/991,156

(22) PCT Filed: May 5, 2009

(86) PCT No.: PCT/FR2009/050828
§ 371 (c)(1),
(2), (4) Date: Nov. 5, 2010

(87) PCT Pub. No.: WO2009/141561
PCT Pub. Date: Nov. 26, 2009

(65) Prior Publication Data
US 2011/0057779 A1    Mar. 10, 2011

(30) Foreign Application Priority Data

May 9, 2008    (FR) ...................................... 08 53055

(51) Int. Cl.
*G06K 7/01* (2006.01)
*H04Q 1/00* (2006.01)

(52) U.S. Cl.
USPC ...................................... 340/10.42; 340/10.1

(58) Field of Classification Search
USPC .................. 340/10.1, 10.2, 10.3, 10.4, 10.41, 340/10.42, 572.1
See application file for complete search history.

(56) References Cited

U.S. PATENT DOCUMENTS

2004/0222878 A1*  11/2004  Juels ............................ 340/10.1
2006/0080732 A1*   4/2006  Ohkubo et al. ................... 726/9

FOREIGN PATENT DOCUMENTS

EP         1 873 674 A1     1/2008
WO     WO 2006/070189 A2    7/2006

OTHER PUBLICATIONS

Chien et al., "Mutual Authentication Protocol for RFID Conforming to EPC Class 1 Generation 2 Standards," Computer Standards and Interfaces, Elsevier Sequoia, Lausanne, CH, vol. 29 (2), pp. 254-259 (Nov. 29, 2006).

* cited by examiner

*Primary Examiner* — Albert Wong
*Assistant Examiner* — Yong Hang Jiang
(74) *Attorney, Agent, or Firm* — Drinker Biddle & Reath LLP (57)    ABSTRACT

The invention relates to a method of authenticating a radio tag by a radio reader, the tag possessing an identifier accessible to the reader via a database of tag identifiers, comprising: dispatching an authentication request by the reader to the tag, dispatching by the tag, a response, calculated by applying a first function to at least the identifier, a calculation by the tag and by the reader of a new identifier, by applying a second function to the identifier, comprising: if the response dispatched by the tag corresponds to a result obtained by applying said first function to an identifier of the base, a dispatching by the reader a first value, calculated by applying a third function to said identifier of the base.

9 Claims, 2 Drawing Sheets

METHOD OF AUTHENTICATING A RADIO TAG BY A RADIO READER

CROSS-REFERENCE TO RELATED APPLICATIONS

This application is the U.S. national phase of the International Patent Application No. PCT/FR2009/050828 filed May 5, 2009, which claims the benefit of French Application No. 08 53055 filed May 9, 2008, the entire content of which is incorporated herein by reference.

FIELD OF THE INVENTION

The invention relates to a technique for authenticating a radiofrequency identification tag by a radiofrequency identification reader.

BACKGROUND

The invention is particularly advantageously applicable in the field of radiofrequency identification, or "RFID".

Radiofrequency identification is a technique for storing and recovering data remotely by using markers called radiofrequency identification tags (or "RFID tags"). A radiofrequency identification tag is a small object, such as a self-adhesive label, which can be glued to, or incorporated in, objects or products. It comprises an antenna associated with an electronic chip which enables it to receive and respond to radiofrequency requests sent from a transmitter-receiver called a reader. Radiofrequency identification tags are, for example, used to identify people when the tags are incorporated in passports, in transport tickets or in payment cards, or to identify products, as with a barcode.

Conventionally, the reader sends a particular interrogation signal over a radio channel, to which the tag responds. One possible response from the tag is a numerical identification of this tag. The reader can then look up a database to identify, or check access for the tag. With a view to protecting private life, notably the private life of people holding radiofrequency identification tags, it is generally desirable for the radiofrequency identification tag authentication protocol by a reader to have three properties:

the protocol must be anonymous, that is to say that it must not be possible for a malicious adversary to identify a tag used in an authentication.

the tag must not be traceable, that is to say that it must not be possible to link two different authentications of one and the same tag, and if the malicious adversary obtains the identifier of a tag by any method whatsoever: by a so-called "reverse engineering" method, by a physical attack on the card, etc., it must not be possible to recognize former authentications of the tag. This last property is called the "forward privacy" property.

When such a protocol is used to identify people, it will be understood that these three properties help to enable private life to be respected.

A protocol, called "OSK" protocol, has been proposed by Ohkubo, Suzuki and Kinoshita, which provides these three security properties. The protocol can be described as follows: a tag has a unique identifier, denoted ID, and a reader suitable for reading the tag has access to a database containing all the tag identifiers. On receiving an authentication request sent by the reader, the tag responds by sending a hash of its identifier, calculated from a first hash function, for example "SHA-256" (for "Secure Hash Algorithm"). We will denote this hash $H_1(ID)$.

Then, the tag updates its identifier ID by calculating a second hash of its identifier, denoted $H_2(ID)$, by using a second hash function $H_2$, different from the first function. The new identifier ID is then $H_2(ID)$.

On receiving the first hash of the identifier $H_1(ID)$, the reader calculates the hash of the identifiers in the database by using the first hash function. If it finds a value equal to $H_1(ID)$, then the reader accepts the authentication of the tag and updates the identifier ID in the same way as the tag: by calculating $H_2(ID)$. If the reader does not find any value equal to $H_1(ID)$ in the database of identifiers, then the reader calculates the hash of all the identifiers by using the second hash function $H_2$ and then it repeats the operation with the newly calculated identifiers until the authentication succeeds.

It is found that, with this protocol:

what circulates between the tag and the reader is a value obtained by applying a hash function to an identifier. A hash function, here denoted H, has the property that, for any x of which the image H(x) is known by the hash function, it is then very difficult to calculate y such that H(x)=H(y). By virtue of this property, the anonymity of the tag is respected. A malicious adversary who recovers the hash of the identifier cannot a priori retrieve the identifier;

each message sent by the tag in response to an authentication request corresponds to a different identifier since the identifier of a tag is updated between two authentications. The non-traceability property is therefore observed; and since the identifier of a tag is updated between two authentication requests and the hash function is deemed non-reversible, then the malicious adversary who would recover a tag identifier would not be able to associate previous authentications with this tag identifier. Thus, the so-called "forward secrecy" property is observed.

However, this authentication protocol has a few weaknesses. In practice, since the tag updates its identifier after each authentication request from the reader, the adversary who would make m successive authentication requests to the tag would provoke m updates by the tag of its identifier and a significant loss of sync between the tag and the reader. Thus, in a real authentication requested by the reader, the latter will update m times all the identifiers in the database of identifiers before finding the identifier that corresponds to the tag currently being authenticated. The m updates correspond to a resynchronization of the reader with the tag. Such an attack, of the denial of service type, has the aim of slowing down, or even saturating, such a radiofrequency identification system to ultimately prevent other authentications.

When the number of tags generated by the radiofrequency identification system is high, then the authentication of a tag becomes costly, in both time and resources. This example of attack, which is easy to conduct, makes an authentication protocol in a radiofrequency identification system ineffective. In a case, for example, in which such a system is located in public transport to enable subscribers to access said transport after being authenticated at an access terminal embodied by a turnstile, by presenting their subscription card containing a radiofrequency identification tag, the discontent of these subscribers is imagined if they have to wait a few seconds for the turnstile to open after having presented their subscription card, notably at peak times.

There is therefore a need for an authentication protocol in a radiofrequency identification system that is not sensitive to denial of service type attacks that tend to render the radiofrequency identification system ineffective.

SUMMARY

The invention addresses this need by proposing a method for authenticating a radiofrequency identification tag by a radiofrequency identification reader, the tag having an identifier accessible to the reader via a database of tag identifiers, comprising:

a sending of an authentication request by the reader to the tag, a sending by the tag of a response, calculated by applying a first function to at least the identifier, a calculation by the tag and by the reader of a new identifier, by applying a second function to the identifier, characterized in that it comprises:

if the response sent by the tag corresponds to a result obtained by applying said first function to an identifier in the base, a sending by the reader of a first value, calculated by applying a third function to said identifier from the base, if the first value sent corresponds to a value obtained by applying the third function to the tag identifier, a replacement in the tag of the identifier with the new identifier calculated by the tag, a sending of a second value to the reader, obtained by applying a fourth function to the new identifier calculated by the tag, if the second value sent corresponds to a value obtained by applying the fourth function to the new identifier calculated by the reader, a replacement in the database of the tag identifier with the new identifier.

With the method according to the invention, the tag and the reader update the tag identifier only in certain conditions.

For the tag, the updating of the identifier is done only after having received from the reader a proof of the knowledge of the tag identifier by the reader. Thus, the tag is assured of having interacted with an honest reader. For the reader, the updating of the tag identifier in the database of identifiers is done only after having received from the tag, and checked, a message certifying that the tag has updated its identifier.

The tag, respectively the reader, is therefore assured of dealing with a reader, respectively a tag, that is honest.

The message sent by the tag to the reader to certify that it has updated its identifier preserves excessive desynchronizations, since this message, sent after an update of its identifier by the tag, triggers the updating by the reader of the tag identifier in the database.

It is not possible to excessively desynchronize the tag and the database. In practice, in a case where an adversary sends m authentication requests to a tag, the adversary not being able to provide the message expected by the tag, the tag does not update its identifier m times, as it would according to a conventional protocol of the prior art. Thus, in a real authentication, the reader does not have to update the identifiers in the database m times before retrieving that of the tag. When the reader manages a large number of identifiers, multiple updates significantly slow down the authentication of a tag. Thus, the method according to the invention is not sensitive to such an attack from the adversary, of the service denial type, which tends to slow down or even saturate the reader to prevent other authentications.

The method according to the invention also has expected security properties:

the authentication method is anonymous: an identifier that circulates between the tag and the reader is in hash form, obtained by applying one or more hash functions to the identifier. Since a hash function is difficult to reverse, a malicious adversary who recovers the hash of the identifier cannot identify the tag used in the authentication;

a tag cannot be traced: in a normal case of use of the protocol, two successive authentications of a tag cannot be linked together because each message sent by the tag in response to an authentication request corresponds to a different identifier since the identifier of a tag is updated between two authentications;

if an adversary obtains the identifier of a tag, he cannot recognize previous authentications of the tag. In practice, the identifier is updated between two successive authentications. Furthermore, the use of hash functions, which are difficult to reverse, does not allow previous authentications to be associated with this tag identifier. This property is called the "forward secrecy" property.

Furthermore, the authentication method remains lightweight at the tag level since it requires only four hash calculations.

In one embodiment of the invention, the method comprises, if the response sent by the tag does not correspond to any result obtained by applying said first function to each of the tag identifiers in the base:

a search for the response sent by the tag among the identifiers in the base to which the second function and then the first function are applied in succession, if the response sent by the tag corresponds to a result obtained by applying the second function and then the first function to a tag identifier from the base, an update in the base of the identifier by applying the second function to said identifier.

With the method according to the invention, it is not possible for an adversary to desynchronize a tag and the database accessed by the reader more than once. In practice, since the tag updates its identifier only after having received from the reader the first value $H_3(ID)$, a desynchronization may be produced by interrupting the protocol after the update of the identifier by the tag, and before the tag sends the second value $H_4(H_2(ID))$ to the reader. In this case, the reader does not update the base and does not replace the tag identifier with the new identifier $H_2(ID)$. The tag and the reader are therefore desynchronized once since the new tag identifier is $H_2(ID)$ whereas the database still has ID as the tag identifier. However, it is not possible to desynchronize the tag and the database once again.

In practice, in a case where an adversary sends a new authentication request to the tag, then, since the adversary cannot produce and send the first value $H_3(ID)$ to the tag since it does not know the identifier of the tag, the tag will not update its identifier.

In a second case where a random element is sent to the reader in response to an authentication request, in order for the reader to search indefinitely for the identifier in the database of identifiers, the reader searches in the base for a hash of the random element obtained by applying the first hash function. If it does not find the hash, then it searches for it in the base by applying to each of the identifiers in the base the second hash function and then the first hash function. If it does not find the hash, the reader no longer performs any search, and the authentication fails. In this case of failure, it is necessarily a non-authentic tag or a false tag. In either case, no identifier is updated, whether at the tag level or at the database level.

However, when the tag and the reader are desynchronized once (because the tag has updated its identifier but not the database) and the reader sends an authentication request for the attention of the tag, then there is a resynchronization of the tag and the database of identifiers. In practice, the reader which receives the response from the tag to the authentication request will find this response in the database of identifiers in its second search in the base, that is to say during the search that it performs by applying the second hash function and then the first hash function to each of the identifiers in the base. The response being found, the tag identifier is then updated in the base, and the authentication protocol is continued. Thus, the tag and the database are resynchronized by this valid authentication request.

In a particular embodiment of the method according to the invention:
  the authentication request includes a first random value (randomvalue1) generated by the reader, and
  the response includes a second random value (randomvalue2) generated by the tag, and a hash obtained by applying the first function to a datum including the identifier of the tag, the first random value (randomvalue1) received from the reader and the second random value (randomvalue2).

The use of random values in the messages reinforces the security of the authentication method. The sending of the first random value, randomvalue1, by the reader makes it possible to avoid a replay in a desynchronization between the tag and the reader. The second random value, randomvalue2, generated by the tag ensures non-traceability between several successive authentications, notably in the case of an attack during which, with certain messages circulating between the tag and the reader being intercepted, the tag identifier would not be updated by the tag.

The invention also relates to a radiofrequency identification tag suitable for being authenticated by a radiofrequency identification reader, the tag having an identifier, and comprising:
  reception means, arranged to receive from the reader an authentication request and a first value,
  sending means, arranged to send to the reader a response to said authentication request and a second value,
  means for calculating said response, arranged to calculate said response by applying a first function to at least the identifier,
  means for calculating a new identifier, arranged to calculate the new identifier by applying a second function to the identifier,
  means for calculating the second value, arranged to calculate the second value by applying a fourth function to the new identifier,
  means for calculating a third value, arranged to calculate said third value by applying a third function to the identifier,
  means for replacing the identifier, arranged to replace the identifier in the tag with the new identifier, and
  comparison means, arranged to compare the received first value and the calculated third value and to activate the means for replacing the identifier if there is a match.

The invention also relates to a radiofrequency identification reader suitable for authenticating at least one radiofrequency identification tag identified by an identifier accessible to the reader by means for accessing a database of tag identifiers, the reader comprising:
  sending means, arranged to send to the tag an authentication request and a first value,
  reception means, arranged to receive from the tag a response to said authentication request and a second value,
  calculation means, arranged to calculate:
    a new identifier of the tag by applying a second function to an identifier from the database, relating to the tag,
    the first value by applying a third function to the identifier from the base relating to the tag, and
    a third value by applying the fourth function to the new identifier,
  means for searching for an identifier relating to the tag in the database, arranged to determine whether the response sent by the tag corresponds to a result obtained by applying the first function to an identifier from the base, the sending means being arranged, in the event of a positive search, to send the first value calculated by applying a third function to said identifier from the base relating to the tag,
  replacement means, arranged to replace in the database the identifier relating to the tag with the new identifier,
  comparison means, arranged to compare the second value received from the tag to the third value, said comparison means being arranged to activate said replacement means in the case where the second value matches the third value.

In a particular embodiment of the reader according to the invention:
  the calculation means are also arranged to apply in succession the second function and then the first function to a tag identifier from the base,
  the means for searching for an identifier relating to the tag in the database are also suitable for searching, in the case where the response sent by the tag does not correspond to any result obtained by applying said first function to each of the tag identifiers in the base, for the response sent by the tag among the identifiers in the base to which the second function and then the first function are applied in succession by the calculation means,
  the replacement means are also suitable, in the case where the response sent by the tag corresponds to a result obtained by applying the second function and then the first function to a tag identifier from the base, for updating the identifier in the base by applying the second function to said identifier.

The invention also relates to a radiofrequency authentication system comprising:
  a radiofrequency identification reader according to the invention, and
  at least one radiofrequency identification tag according to the invention.

The invention also relates to a computer program intended to be installed in a memory of a radiofrequency identification reader, comprising instructions for implementing the steps of the method for authenticating a radiofrequency identification tag according to the invention which are executed by the reader, when the program is executed by a processor.

The invention also relates to a data medium on which is stored the computer program according to the invention.

BRIEF DESCRIPTION OF THE DRAWINGS

Numerous details and advantages of the invention will be better understood on reading the description of a particular embodiment with reference to the appended diagrams given as nonlimiting examples, and in which.

DETAILED DESCRIPTION

Figure 1:
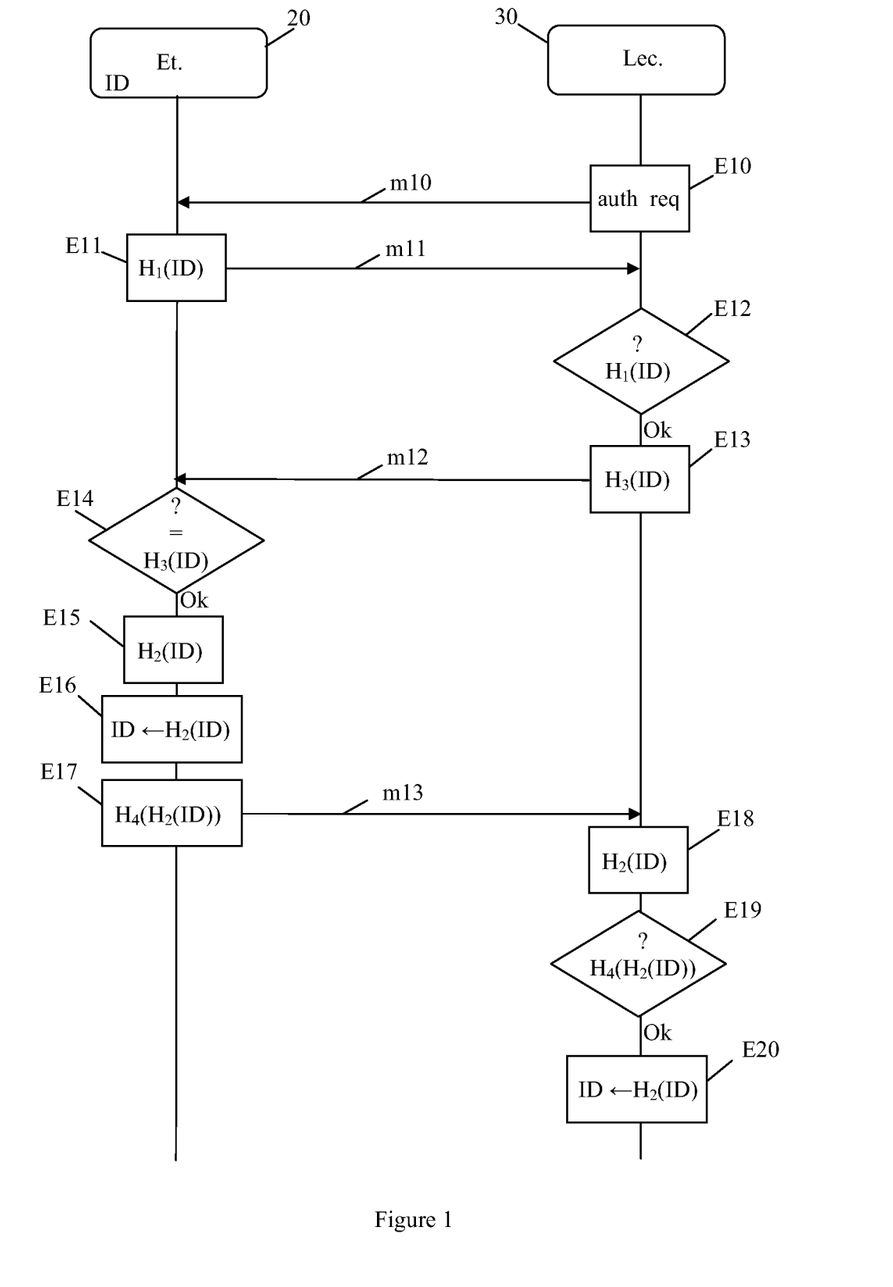
FIG. 1 represents the steps of the method for authenticating a radiofrequency identification tag by a radiofrequency identification reader, according to a particular embodiment of the invention.

The steps of a method for authenticating a radiofrequency identification tag by a radiofrequency identification reader will now be described in relation to FIG. 1.

A radiofrequency identification reader 30 is arranged to authenticate a set of radiofrequency identification tags referenced in a database of tag identifiers, not represented, to which the reader 30 has access. A radiofrequency identification tag 20, provided with a unique identifier ID, is referenced in the database of identifiers to which the reader 30 has access.

If the authentication succeeds, the identifier ID of the tag 20 is updated on the one hand in the tag, and on the other hand in the database 30, using a new identifier obtained by applying a hash function, denoted $H_2$ which will be explained later, to the identifier ID of the tag 20. Such an update is comparable to that performed by the radiofrequency identification tag authentication protocol according to the prior art, for example the "OSK" protocol.

In an initial step E10, the reader 30 sends an authentication request in a message m10.

After receiving the authentication request m10, in a step E11 for calculating and sending a response, the tag 20 calculates a hash of its identifier $H_1(ID)$ and sends a response m11 including this identifier hash $H_1(ID)$. The hash $H_1(ID)$ is calculated by applying a known first hash function $H_1$ to its identifier ID. For example, the tag 20 uses SHA-256 (SHA standing for "Secure Hash Algorithm") as the hash function.

In a search step E12, the reader 30 calculates the hash of each of the identifiers in the database of tag identifiers by means of the first hash function $H_1$ and compares the hash obtained to the response m11 received. If the hash obtained matches the hash $H_1(ID)$ received from the tag in the response m11, this means that the reader 30 has found the identifier of the tag 20 in the database.

If the search performed in the step E12 is positive (Ok branch in FIG. 1), in a step E13 the reader 30 calculates a first value $H_3(ID)$ by applying a third hash function $H_3$ to the identifier ID of the tag then sends a message m12 containing this first calculated value $H_3(ID)$. The message m12 is a proof certifying that the reader 30 knows the identifier ID. It therefore enables the tag 20 to check the authenticity of the authentication request received from the reader 30 and thus the honesty of the reader 30.

In a checking step E14, the tag calculates a check value by applying the third hash function to its identifier ID, and compares the calculated check value to the first value received in the message m12. If there is a match, the tag 20 has proof that the reader knows its identifier ID. Thus, it is assured of interacting with an honest reader 30. In practice, a dishonest reader, which does not a priori know the identifier of the tag 20, cannot send a message containing a value calculated from this identifier.

In a step E15, following a positive check performed in the step E14 (Ok branch in FIG. 1), the tag 20 calculates an update of its identifier. For this purpose, the tag applies the second hash function $H_2$ to its identifier ID to obtain a new identifier $H_2(ID)$. Preferably, the second hash function $H_2$ is different from the first hash function $H_1$.

In a step E16, the tag replaces, in a memory that is not represented, its identifier ID with the new identifier $H_2(ID)$.

In a variant embodiment of the invention, the calculation of the new identifier and the replacement in the memory of the tag 20 of the identifier ID with the new identifier are done in one and the same step. Thus, there is no temporary storage of the new identifier $H_2(ID)$, which may be advantageous for tags that have a reduced memory capacity.

In a step E17, the tag 20 sends a message m13 containing a second value calculated by applying a fourth hash function $H_4$ to the new identifier $H_2(ID)$ calculated in the step E15. The message m13 is sent by the tag 20 in order to certify to the reader 30 that the tag 20 has performed the update of its identifier ID. Since the message m13 depends on the identifier ID of the tag 20, an adversary is therefore not able to send such a message. The reader 30 which receives the message m13 is therefore assured that this message does indeed originate from the tag that it is in the process of authenticating.

In a step E18, the reader calculates the new identifier of the tag by applying the second hash function $H_2$ to the identifier ID.

In a checking step E19, the reader calculates a check value by applying the fourth hash function to the new identifier $H_2(ID)$ calculated in the step E18, and compares the calculated check value to the second value received in the message m13. If they match, the reader 30 is assured that the tag 20 has performed an update of its identifier ID.

In a step E20, following a positive check performed in the step E19 (Ok branch in FIG. 1), the reader 30 updates the identifier of the tag 20 by replacing, in the database of identifiers, the identifier ID of the tag 20 with the new identifier $H_2(ID)$ calculated in the step E18.

In a particular embodiment of the invention which is not represented, in which, in the step E12, the response $H_1(ID)$ received from the tag is not found in the database of tag identifiers, then the reader 30 compares the response $H_1(ID)$ received to a second hash calculated for each identifier in the database of tag identifiers by successively applying the second hash function $H_2$, and then the first hash function $H_1$. If the response received is found, then the reader updates, in the base, the identifier ID by applying the second hash function to said identifier. It will be noted that only the identifier of the tag 20 is updated in the database of identifiers. The method then continues with the step E13, the identifier ID of the tag 20 then being the updated identifier $H_2(ID)$.

In this embodiment of the invention, if the response received is not found by the reader, then the authentication method is stopped. There is no provision for a new search to be made for the response among the identifiers in the base to which the second hash function and then the first hash function would have been applied twice. Such a search is, in practice, pointless, since it is not possible, with the inventive method, to desynchronize a tag and the database which the reader accesses more than once.

The hash functions $H_1$, $H_2$, $H_3$ and $H_4$ used to calculate the various hashes are, for example, functions taken from SHA-256, SHA-384, SHA-512.

In a particular embodiment of the invention, it is possible to use just one hash function, here denoted H, and to calculate, for example:

$H_1(ID)$ by applying the hash function H with a concatenation of a constant, for example 1, to the identifier ID of the tag (denoted $H_1(1\|ID)$), $H_2(ID)$ by applying the hash function H with a concatenation of a second constant, for example 2, to the identifier ID of the tag (denoted $H_2(2\|ID)$), $H_3(ID)$ by applying the hash function H with a concatenation of a third constant, for example 3, to the identifier ID of the tag (denoted $H_3(3\|ID)$), $H_4(ID)$) by applying the hash function H with a concatenation of a fourth constant, for example 4, to the identifier ID of the tag (denoted $H_4(4\|ID)$).

Thus, for one and the same parameter, in this case the identifier ID of the tag, four different hashes are obtained from the same hash function H. This embodiment is advantageous in the case of tags with restricted memory capacity. In practice, this embodiment requires only a single hash function.

In an alternative embodiment of the invention that is not represented, the authentication request m10 sent by the reader 30 to the tag 20 also includes a first random value, randomvalue1, generated by the reader. In the step E11 for calculating and sending a response, the tag uses the hash function $H_1$ to calculate a hash of a datum obtained by concatenation of the identifier ID of the tag, the random value randomvalue1 received from the reader, and a second random value, randomvalue2, generated by the tag. The concatenation is denoted H1(ID‖randomvalue1‖randomvalue2). The response m11 sent by the tag includes the hash obtained and the second random value randomvalue2.

The sending of the first random value randomvalue1 by the reader makes it possible to avoid a replay when there is a desynchronization between the tag and the reader. In practice, if an adversary is likely to observe or even intercept the messages that flow between the reader and the tag, for example the response m11 from the tag, then it may, initially, intercept the message m13 sent by the tag to the reader in order to certify that the identifier has been updated by the tag. The interception of the message m13 provokes a desynchronization between the tag and the database of identifiers since the tag has replaced its identifier with the new identifier, but the reader, not having received the message m13, has not replaced the identifier ID of the tag with the new identifier in the database of identifiers. The adversary may then, following a new authentication request sent by the reader, return the response m11 that it had observed in previous exchanges, then the message m13 that it had intercepted. Thus, the reader believes it has authenticated a valid tag although it is the adversary who responds to the authentication request from the reader with messages previously sent. An erroneous tag, as it were, mastered by the adversary may be validly authenticated by the reader. The random value randomvalue1 sent by the reader avoids this kind of attack since the tag returns, following an authentication request from the reader, a response m11 that contains a hash dependent on the random value randomvalue1. An adversary that does not know the identifier of the tag cannot produce such a response.

The second random value randomvalue2 generated by the tag ensures non-traceability between several successive authentications. In practice, let us assume that, during a first authentication, the message m12 does not reach the tag (message not sent by the reader, or not received by the tag). In this case, the tag does not calculate its new identifier and does not replace its identifier with the new identifier. Then, during a new authentication of the tag by the reader, following the sending by the reader of an authentication request, the tag returns a response m11 that is different to the response sent during the first authentication although the identifier of the tag has not changed between the two authentications. In practice, the random value randomvalue2 generated by the tag is different upon each authentication. Thus, the property of non-traceability between successive authentications is indeed guaranteed since it is not possible to link two authentications of one and the same tag together.

Figure 2:
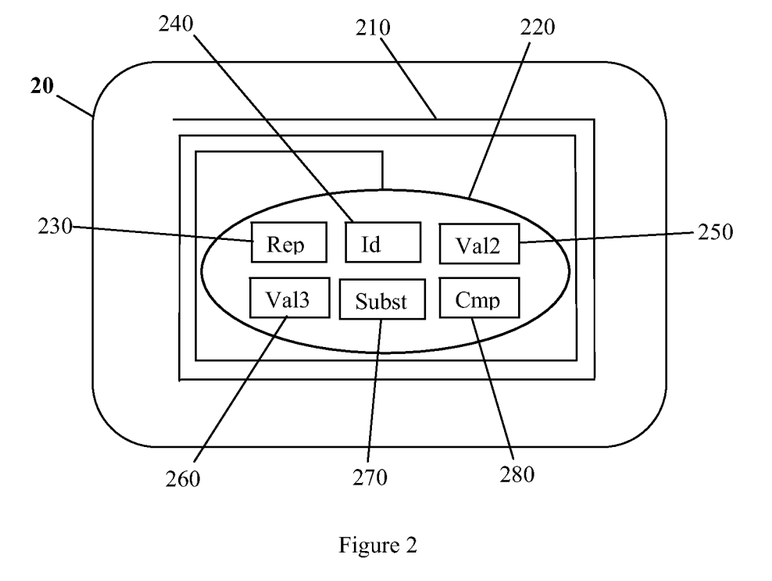
FIG. 2 represents a first exemplary embodiment of a radiofrequency identification tag according to the invention.

A radiofrequency identification tag according to the invention will now be described in relation to FIG. 2. A tag 20 according to the invention is suitable for dialogue with a radiofrequency identification reader (not represented in FIG. 2) during an authentication sequence conforming to the steps of the method according to the invention described previously.

In the particular example described here, the tag 20 is a passive device receiving its energy from the reader in an interrogation by the latter. The tag 20 has a unique identifier ID and generally comprises:

sending and receiving means comprising an antenna 210, suitable for receiving from a reader and sending to a reader. The reception means are suitable for receiving an authentication request and a first value ($H_3(ID)$) from the reader. The sending means are suitable for sending a response and a second value ($H_4(H_2(ID))$) to the reader;

a silicon chip 220 comprising a plurality of transistors suitable for forming logic gates of a non-programmable wired logic. The wired logic defines:

means 230 of calculating the response ($H_1(ID)$), arranged to apply a first function ($H_1$) to at least the identifier, means 240 of calculating a new identifier, arranged to calculate the new identifier $H_2(ID)$ by applying a second hash function $H_2$ to the identifier, means 250 of calculating the second value, arranged to calculate the second value by applying a fourth hash function $H_4$ to the new identifier $H_2(ID)$, means 260 of calculating a third value, arranged to calculate said third value by applying a third function $H_3$ to the identifier, means 270 of replacing the identifier, arranged to replace the identifier in the tag with the new identifier $H_2(ID)$, comparison means 280, arranged to compare the first value $H_3(ID)$ received from the reader to the third value, said comparison means activating the means 270 of replacing the identifier in the case where the first value is equal to the third value.

In a particular embodiment of the invention, in which the authentication request received from the reader includes the random value randomvalue1, and the response returned by the tag includes the second random value randomvalue2, the tag also includes a random value generator (not represented), arranged to generate random values.

In this particular embodiment of the invention, the reception means 210 are arranged to also receive the first random value randomvalue1 from the reader. The means 230 of calculating the response are also arranged to cooperate with the random value generator and to apply the first hash function $H_1$ to a datum comprising the identifier ID of the tag, the first random value randomvalue1 and a second random value randomvalue2 generated by the random value generator. For example, the datum is a concatenation of these three values.

Figure 3:
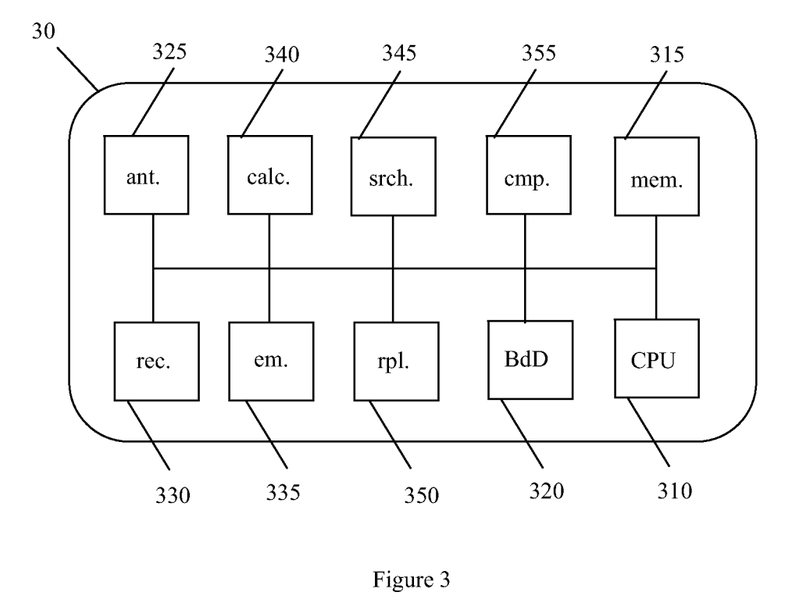
FIG. 3 represents a first exemplary embodiment of a radiofrequency identification reader arranged to authenticate a radiofrequency identification tag represented in FIG. 2.

A radiofrequency identification reader according to the invention will now be described in relation to FIG. 3.

A radiofrequency identification reader 30 is an active device sending radiofrequencies which activates a tag (not represented in FIG. 3) that passes in proximity to it by supplying it with an energy that it needs. The reader 30 according to the invention is suitable for dialogue with the tag during an authentication sequence conforming to the steps of the method according to the invention described previously.

The reader 30 comprises a number of modules:

a processing unit 310, or "CPU" (Central Processing Unit), a set of memories, including a volatile memory 315, or "RAM" (Random Access Memory) used to execute code instructions, store variables, etc., an antenna 325, suitable for sending and receiving via the radio channel, a transmission module 335, arranged to send requests to the tag. The transmission module 335 uses the antenna 325 to send and, when coupled to the antenna 325, it constitutes transmission means of the reader 30. In particular, the transmission means are arranged to send the tag an authentication request and a first value $H_3(ID)$, a reception module 330, arranged to receive from the tag responses to requests transmitted by the transmission means 325, 335. The reception module 330 uses the antenna 325 to receive and, when coupled to the antenna 325, it constitutes reception means of the reader 30. In particular, the reception means are arranged to receive from the tag a response $H_1(ID)$ and a second value $H_4(H_2(ID))$, a module 320 for accessing a database of tag identifiers external to the reader, not represented, a calculation module 340, arranged to calculate a new identifier of the tag by applying a second hash function $H_2$ to the identifier, to calculate the first value ($H_3(ID)$) by applying a third hash function $H_3$ to said identifier, to calculate a third value by applying the fourth function $H_4$ to the new identifier ($H_2(ID)$), a search module 345, arranged to search for the response $H_1(ID)$ received from the tag in the database of identifiers by applying a first function to the identifiers in the base, the sending means 335, 325 sending the third value $H_3(ID)$ calculated by applying the third function $H_3$ to said identifier in the case where the search means find the response, a module 350 for replacing the identifier, arranged to replace the identifier of the tag with the new identifier in the database of identifiers, a comparison module 355, arranged to compare the second value $H_4(H_2(ID))$ received from the tag to the third value, said comparison means activating the module 350 for replacing the identifier in the case where the second value is equal to the third value.

The modules communicate via a communication bus.

The modules 320, 330, 335, 340, 345, 350, 355 are arranged to implement the steps of the method for authenticating an RFID tag by the radiofrequency identification reader described previously. They are preferably software modules comprising software instructions for executing the steps of the tag authentication method.

The invention therefore also relates to:
a computer program comprising instructions for implementing the method of authenticating a tag as described previously, when this program is executed by a processor;
a storage medium that can be read by a reader on which the computer program described above is stored.

The software modules can be stored in, or transmitted by, a data medium. The latter may be a hardware storage medium, for example a CD-ROM, a magnetic diskette or a hard disk, or even a transmission medium such as a signal, or a telecommunication network.

In a particular embodiment of the invention in which the response $H_1(ID)$ returned by the tag does not correspond to any result obtained by applying said first function to each of the tag identifiers in the base, a search is carried out for the response sent among the identifiers in the base to which the second function and then the first hash function are applied successively. In the case where the response $H_1(ID)$ sent by the tag corresponds to a result obtained by applying the second function, then the first function to a tag identifier in the base $H_1(H_2(ID))$, the identifier ID of the tag is updated in the base by applying the second function ($H_2$) to said identifier, the identifier ID of the tag 20 then being the updated identifier $H_2(ID)$. In this particular embodiment:

the calculation means 340 are also arranged to apply in succession the second function $H_2$ and then the first function $H_1$ to a tag identifier in the base, the means 345 for searching for an identifier relating to the tag in the database are suitable for also searching, in the case where the response $H_1(ID)$ sent by the tag does not correspond to any result obtained by applying said first function to each of the tag identifiers in the base, for the response sent by the tag among the identifiers in the database to which the second function $H_2$ and then the first function $H_1$ are applied in succession by the calculation means 340, the replacement means 350 are also arranged to update the identifier ID in the base by applying the second hash function $H_2$ to said identifier, in the case where the response $H_1(ID)$ sent by the tag corresponds to a result obtained by applying the second function and then the first hash function to a tag identifier in the base $H_1(H_2(ID))$.

In another particular embodiment of the invention, in which the authentication request sent by the reader includes the random value randomvalue1, and the response received from the tag includes the second random value randomvalue2, the reader also comprises:

a random value generator (not represented), arranged to generate random values.

In this embodiment of the invention:
the transmission means 325, 335 are arranged to cooperate with the random value generator to send the first random value randomvalue1 to the tag in the authentication request, the reception means 325, 330 are arranged to also receive the second random value randomvalue2 from the tag, the calculation means 340 are also arranged to apply the first hash function $H_1$ to a datum comprising an identifier from the base, the first random value randomvalue1 and the second random value randomvalue2 received from the tag. For example, the datum is a concatenation of these three values.

In a particular embodiment of the invention, not detailed, the tag 20 is an active device. The tag 20 is then equipped with a battery enabling it to send signals. Thus, the tag 20 and the reader 30 can interact over a greater distance than in the case where the tag 20 is a passive device which receives its energy from the reader.

In another embodiment of the invention that is not detailed, the tag 20 has a structure comparable to that of a chip card and comprises a cryptographic microprocessor, a data memory and a program memory.

The invention claimed is:
1. A method for authenticating a radiofrequency identification tag by a radiofrequency identification reader, the tag having an identifier accessible to the reader via a database of tag identifiers, comprising:
sending of an authentication request by the reader to the tag;
sending by the tag of a response, calculated by applying a first function to at least the identifier;
calculating, by the tag and by the reader, a new identifier, by applying a second function to the identifier;
if the response sent by the tag corresponds to a result obtained by applying said first function to an identifier in the database, sending by the reader of a first value, calculated by applying a third function to said identifier from the database;

if the first value sent corresponds to a value obtained by applying the third function to the tag identifier, replacing in the tag the identifier with the new identifier calculated by the tag;

sending of a second value to the reader, obtained by applying a fourth function to the new identifier calculated by the tag, if the second value sent corresponds to a value obtained by applying the fourth function to the new identifier calculated by the reader, replacing, in the database, the tag identifier with the new identifier.

2. The method as claimed in claim 1, further comprising:

if the response sent by the tag does not correspond to any result obtained by applying said first function to each of the tag identifiers in the database, searching for the response sent by the tag among the identifiers in the base to which the second function and then the first function are applied in succession;

if the response sent by the tag corresponds to a result obtained by applying the second function and then the first function to a tag identifier from the database, updating in the database of the identifier by applying the second function to said identifier.

3. The method as claimed in claim 1, wherein:

the authentication request includes a first random value generated by the reader; and the response includes a second random value generated by the tag, and a hash obtained by applying the first function to a datum including the identifier of the tag, the first random value received from the reader and the second random value.

4. A radiofrequency identification tag suitable for being authenticated by a radiofrequency identification reader, the tag having an identifier and system comprising:

a receiver arranged to receive from the reader an authentication request and a first value;

a response calculator for calculating said response, arranged to calculate said response by applying a first function to at least the identifier;

a new identifier calculator for calculating a new identifier, arranged to calculate the new identifier by applying a second function to the identifier;

a second value calculator for calculating the second value, arranged to calculate the second value by applying a fourth function to the new identifier;

a third value calculator for calculating a third value, arranged to calculate said third value by applying a third function to the identifier;

a replacing element for replacing the identifier, arranged to replace the identifier in the tag with the new identifier; and a comparison element arranged to compare the received first value and the calculated third value and to activate the replacing element and the sender to send the second value to the reader if there is a match.

5. A radiofrequency identification reader suitable for authenticating at least one radiofrequency identification tag identified by an identifier accessible to the reader by means for accessing a database of tag identifiers, the reader comprising:

a sender arranged to send to the tag an authentication request and a first value;

a receiver arranged to receive from the tag a response to said authentication request and a second value;

a calculator arranged to calculate:

a new identifier of the tag by applying a second function to an identifier from the database, relating to the tag, the first value by applying a third function to the identifier from the database relating to the tag; and third value by applying the fourth function to the new identifier;

a searching element for searching for an identifier relating to the tag in the database, arranged to determine whether the response sent by the tag corresponds to a result obtained by applying the first function to an identifier from the database, the sender being arranged, in the event of a positive search, to send the first value calculated by applying a third function to said identifier from the database relating to the tag, a replacement element arranged to replace in the database the identifier relating to the tag with the new identifier;

a comparison element arranged to compare the second value received from the tag to the third value, said comparison element being arranged to activate said replacement element in the case where the second value matches the third value.

6. The radiofrequency identification reader as claimed in claim 5, wherein:

the calculation element is also arranged to apply in succession the second function and then the first function to a tag identifier from the database;

the searching element for searching for an identifier relating to the tag in the database is also suitable for searching, in the case where the response sent by the tag does not correspond to any result obtained by applying said first function to each of the tag identifiers in the database, for the response sent by the tag among the identifiers in the database to which the second function and then the first function are applied in succession by the calculator;

the replacement element is also suitable, in the case where the response sent by the tag corresponds to a result obtained by applying the second function and then the first function to a tag identifier from the database, for updating the identifier in the database by applying the second function to said identifier.

7. A radiofrequency authentication system comprising:

a radiofrequency identification reader as claimed in claim 5, and at least one radiofrequency identification tag suitable for being authenticated by a radiofrequency identification reader, the tag having an identifier and system comprising:

a receiver arranged to receive from the reader an authentication request and a first value;

a sender arranged to send to the reader a response to said authentication request and a second value;

a response calculator for calculating said response, arranged to calculate said response by applying a first function to at least the identifier;

a new identifier calculator for calculating a new identifier, arranged to calculate the new identifier by applying a second function to the identifier;

a second value calculator for calculating the second value, arranged to calculate the second value by applying a fourth function to the new identifier;

a third value calculator for calculating a third value, arranged to calculate said third value by applying a third function to the identifier;

a replacing element for replacing the identifier, arranged to replace the identifier in the tag with the new identifier; and a comparison element arranged to compare the received first value and the calculated third value and to activate the means for replacing the identifier if there is a match.

8. A non-transitory computer program product comprising instructions for installation in a memory of a radiofrequency identification reader, for implementing the steps of the method for authenticating a radiofrequency identification tag as claimed in claim 1 which are executed by the reader, when the program is executed by a processor.

9. A data medium on which is stored the computer program as claimed in claim 8.

* * * * *